Feb. 10, 1931. F. C. PALAZZO 1,792,392
PROCESS FOR THE MANUFACTURING OF TURPENTINE, PINE OIL,
AND ROSIN FROM WOODY MATERIALS RICH IN OLEORESIN
Filed Aug. 1, 1927 2 Sheets-Sheet 2
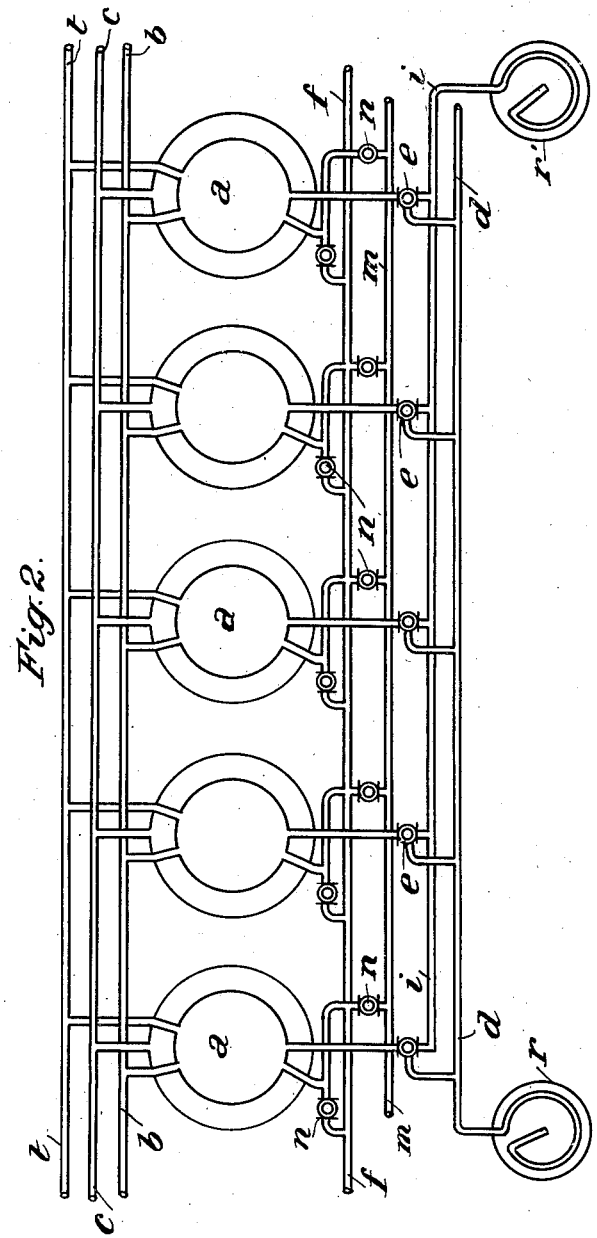
F. C. Palazzo
INVENTOR Patented Feb. 10, 1931

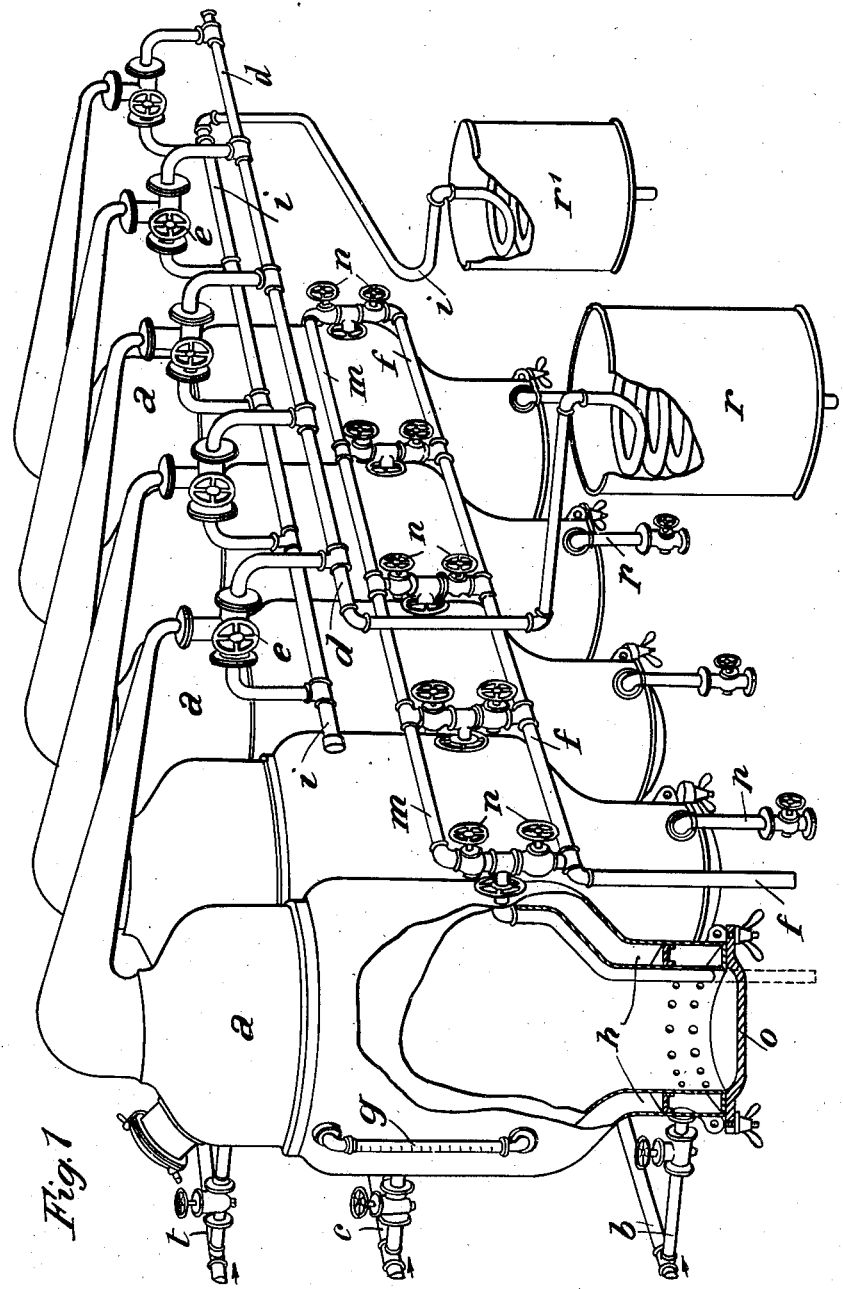

1,792,392

UNITED STATES PATENT OFFICE

FRANCESCO CARLO PALAZZO, OF FLORENCE, ITALY

PROCESS FOR THE MANUFACTURING OF TURPENTINE, PINE OIL, AND ROSIN FROM WOODY MATERIALS RICH IN OLEORESIN

Application filed August 1, 1927, Serial No. 209,941, and in Italy June 15, 1927.

The object of the invention is an alkali solvent process to fully utilize coniferous wood rich of oleo-resin (logs and lower parts of pine trunks) and more exactly for the extraction out of said materials turpentine oil, pine oil and rosin.

According to the invention the direct extraction by means of gasoline and other fractions of petroleum heretofore employed is not used, but more advantageously extraction is obtained by the combined use of an alkaline solution and an organic solvent gasoline, pinene and the like, said products being thus obtained with a high yield and a high degree of purity.

Moreover, the exhausted woody material, residual of the extraction process is very well adapted, owing to the minimum quantity of rosin contained as well as to the fact that before the treatment the woody material is cut to a size adapting it to be further utilized for the preparation of chemical woody pulp.

Owing to this subsequent use the woody material impregnated with oleo-resin instead of being reduced into irregular chips in form and size by "hagging" and "shredding" as have been heretofore done, is cut by means of a cutting machine similar to those used in the cellulose industry, so that chips are obtained which owing to their form and size are very well adapted for the manufacture of chemical (woody) pulp and for the process for extraction of oleo-resin the circulation of the alkaline liquid used is favoured in a high degree.

The woody material for the extraction after being cut as above mentioned is introduced into stills and subjected to the action of a strong steam current of the pressure of 3–4 atmospheres. In this way the greater part of the turpentine oil contained in the woody material is volatilized and after condensation by suitable condensers connected with the still is separated from the water in a Florentine receiver.

Subsequently the chips are treated for the further extraction of pine oil and rosin. This extraction takes place in the same stills where the distillation occurred, said stills remaining connected with their respective condensers, the extraction being obtained by utilizing an aqueous solution of sodium hydrate and water which acts on the chips at a temperature of 100–105° C. in a variable concentration from 1,5 to 2,5 per cent according to the content in the wood of the material to be extracted. The alkaline liquid is brought to and kept at said temperature by means of indirect steam circulating in the walls of the still while a direct steam current is injected into the body of the still's charge. Also the proportion in which the alkaline solution is employed with respect to the woody material may be varied according to the content of the material to be extracted, a quantity of liquid being usually used varying from 140 to 180 liters for each 100 kg. of dry chips.

By operating in the way mentioned the rosin contained in the chips is extracted and transformed into an alkaline soap which is easily soluble in water and at the same time, as the saponification of the rosin is progressing and the lixiviation of the wood therewith, the direct steam used carries away the pine oil, this gradually flowing out of the woody tissue to form an emulsion with the alkaline liquid, thus the pine oil is dragged along by the steam into the condenser where the oil is condensed.

To obtain in the best way the extraction of the rosin in form of soluble soap and exactly to obtain in the shortest time the greatest yield, the lixiviation of the woody material by means of the alkaline liquid is effected by applying the counter current principle. To this object the stills functioning at the same time as extractors are collected in groups of five to form a battery, in which according to the principle mentioned the circulation of the alkaline liquid takes place at intervals of time determined, (generally of one hour) from the charge nearly deprived of the rosin towards the charge progressively less exhausted.

During such a work of the stills as a diffusion battery each of them is of course in a different step of functioning, if a still, for instance, is in the first step, that is of steam distillation, three other stills are in different steps of extraction, the remaining stills being in the last step of the discharge of the exhausted material and charging of the fresh chips.

The solution of rosin soap gradually is discharged into ample vats of wood or in wide receptacles of cement and before being completely cool receives an addition of diluted sulphuric acid (20%) in the quantity strictly necessary to produce the complete decomposition of the alkaline resinate. By agitating the liquid, during the addition of the acid, the rosin is soon separated under the form of a granulous precipitate which may be easily isolated by decanting the greater part of the liquid and subjecting the puddly mash to centrifugation, during which two or three water washings are effected.

The raw rosin thus obtained is digested in three or four parts of an organic solvent, which may be boiling gasoline at 90–100° C. or the pinene of the turpentine oil, then heating more or less according to the ebullition point of the solvent used, in any case without exceeding 100° C., the water and the greater part of the brown organic and not resinous substances remaining undissolved, while the resinous acids are immediately dissolved.

The solution of these acids in the organic solvent, decanted of the watery liquid and brown undissolved substances is left to cool and after a new decantation of the small quantity of residue abandoned during cooling the solution is at last subjected to distillation.

This distillation comprises two steps. The solvent is first distilled by means of direct and indirect steam reducing the volume to one fourth. Then the solution of rosin thus concentrated is passed into a vacuum in which the distillation of the solvent is completed without contact with atmospheric oxygen, the finished product being thus rapidly obtained, that is the rosin deprived of all the pine oil and solvent and with a colour sensibly clearer than the wood rosin prepared by other known processes.

All the operations above mentioned characterize the process according to application and constitute as many steps of said alkali solvent process. Furthermore they secure a whole series of advantages which may be summed up as follows:

1. Complete exhaustion of the woody material together with a high yield of products and possibility of using the exhausted chip for the manufacture of the chemical wood pulp;

2. Excellent quality of all the three products mentioned, turpentine oil, pine oil, rosin;

3. Great economy of organic solvent and possibility of doing away with gasoline, the pinene being also well adapted for the purification of raw rosin, the pinene being obtained from the turpentine oil produced by the same process.

For volatilizing the greater part of the turpentine contained in the coniferous wood applicant uses a direct steam current of only 3–4 atm. of pressure. With this steam (of comparatively feeble pressure and not superheated) the greater part of turpentine is actually expelled whilst the pine oil, tenaciously retained by the rosin and which with the latter forms a rather dense balm or "oleoresin" of feeble steam tension, is only distilled for a minimum part.

The greater part of the pine oil, on the other hand, is obtained in the second stage of the distillation in a steam current, namely in the distillation which takes place when the woody material already deprived of the greater part of the turpentine oil is extracted with alkaline solution. Thereupon, as the rosin is being saponified and becoming soluble in the watery liquor, is extracted from the wood, the pine oil is set free and therefor acquiring by the disappearance of the rosin its own steam tension may be promptly volatilized even by steam under feeble pressure (3–4 atm.) without the necessity of using superheated steam. On the other hand, in the American processes in use one cannot do without the use of superheated steam, because the distillation of the pine oil is effected therein when there is still the total rosin in the wood, and in these conditions the pine oil is so tenaciously retained that for expelling same superheated steam must be used.

In applicant's process the pine oil which is distilled in the second (alkaline) stage of the extracting process is also nearly devoid of turpentine because the latter is distilled for the greater part in the first stage.

In the drawings, Fig. 1 is a horizontal perspective view of the apparatus.

Fig. 2 is a top plan view of the stills.

The device comprises a still-extractor battery of five stills $a$, each of which is capable of working either as a still or as an extractor. The chips loaded in the stills ($a$) are submitted to the action of a strong steam current which passes through the inside of each still from induction tubes ($b$). With this first operation the greater part of the turpentine (about ¾) contained in the oleo-resin, is volatilized and collected by condensation by means of condensers ($r$), which are joined to each of the stills with a tube ($d$), by two-way valves ($e$). Each still is able to communicate with the condensers independently of the rest of the battery.

The chips, deprived as has been said above of the greater part of the turpentine are later submitted in the same still to a very weak alkaline solution, which is run through the stills by air pressure through conduit ($f$), regulating the amounts by means of the indicator ($g$).

In each of the still-extractors heating by indirect steam is applied by means of a jacket ($h$) and induction pipe ($c$) and with direct steam induction tubes ($b$), so that, while the alkaline solvent reacts easily on the woody material, extracting the rosin, the live steam at the same time volatilizes the pine oil less volatile than turpentine, which was previously retained by the rosin and for that reason did not pass over with said turpentine.

The pine oil thus liberated from the woody material is condensed in another condenser ($r^1$), which is joined to the separate elements of the battery by means similar to that of the condenser ($r$), through tubes ($i$) and valves ($e$).

The exhaustion of the woody material on the part of the alkaline liquid is practically arrived at in a complete manner applying to the washings the counter current principle, so that the circulation of the liquid itself is effected from the almost rosinless charge towards those progressively less exhausted, up to the fresh charge.

The alkaline liquid can be circulated by the help of compressed air, which reaches every element of the special conductor ($t$) from any one to another of the elements of the battery, with junction ($f$) and with conductor ($m$) and by means of a series of double taps with three ways ($n$).

Thus it is made possible to place in communication any two of the elements of the battery.

The stills $a$ can be emptied through the removable bottom $o$.

The alkaline rosinous solution can be removed from the stills through the pipes $p$ into suitable vats where the rosin can be treated for precipitation as has been pointed out above.

Having particularly described my invention what I claim is:

1. The process of treating coniferous wood to separate turpentine oil, pine oil and rosin contained therein which comprises the following steps: first reducing the wood to chips of a size and shape to permit subsequent use in the manufacture of wood pulp; second distilling said chips by the direct action of a strong current of steam until approximately 75 per cent of the turpentine oil is volatilized, separating said turpentine oil from steam by condensation; third continuing the heating of said chips from which the turpentine has been removed with live steam after having added thereto a very weak alkaline solution to volatilize the pine oil and the turpentine oil tenaciously held by the rosin and to saponify the rosin, separating said turpentine oil and pine oil from the steam and drawing off the aqueous solution of rosin soap and heating said rosin soap solution with acid to recover rosin.

2. The process of treating coniferous wood to separate turpentine oil, pine oil and rosin contained therein, which comprises the following steps: first reducing the wood to chips of a size and shape to permit subsequent use in the manufacture of wood pulp; second distilling said chips by the direct action of a strong current of steam until approximately 75 per cent of the turpentine oil is volatilized separating said turpentine oil from steam by condensation; third heating said chips from which the turpentine has been removed with live steam after having added thereto a very weak alkaline solution to volatilize the pine oil and the turpentine oil tenaciously held by the rosin and to saponify the rosin; separating said turpentine oil and pine oil from the steam and drawing off the aqueous solution of rosin soap and treating said rosin soap solution with a dilute sulfuric acid solution, whereby the rosin is separated as a granulous compound and separating the granulous rosin by conventional means, treating the separate rosin with an organic solvent, such as gasoline and pinene to dissolve the resinous acids, and decanting the water and the brown resinous organic substances remaining undissolved, finally boiling the organic solution to one fourth its volume and distilling this solution in vacuo to eliminate all the solvent and thereby produce pure rosin.

In testimony whereof I have hereunto signed my name.

FRANCESCO CARLO PALAZZO.